March 11, 1941.   W. O. FROHRING ET AL   2,234,240
INSTRUMENT FOR DETERMINING VITAMIN A DEFICIENCY
Filed Oct. 26, 1937   4 Sheets-Sheet 1

INVENTORS
William O. Frohring
Howard F. Seibert
Joseph M. Tabor
BY
ATTORNEYS

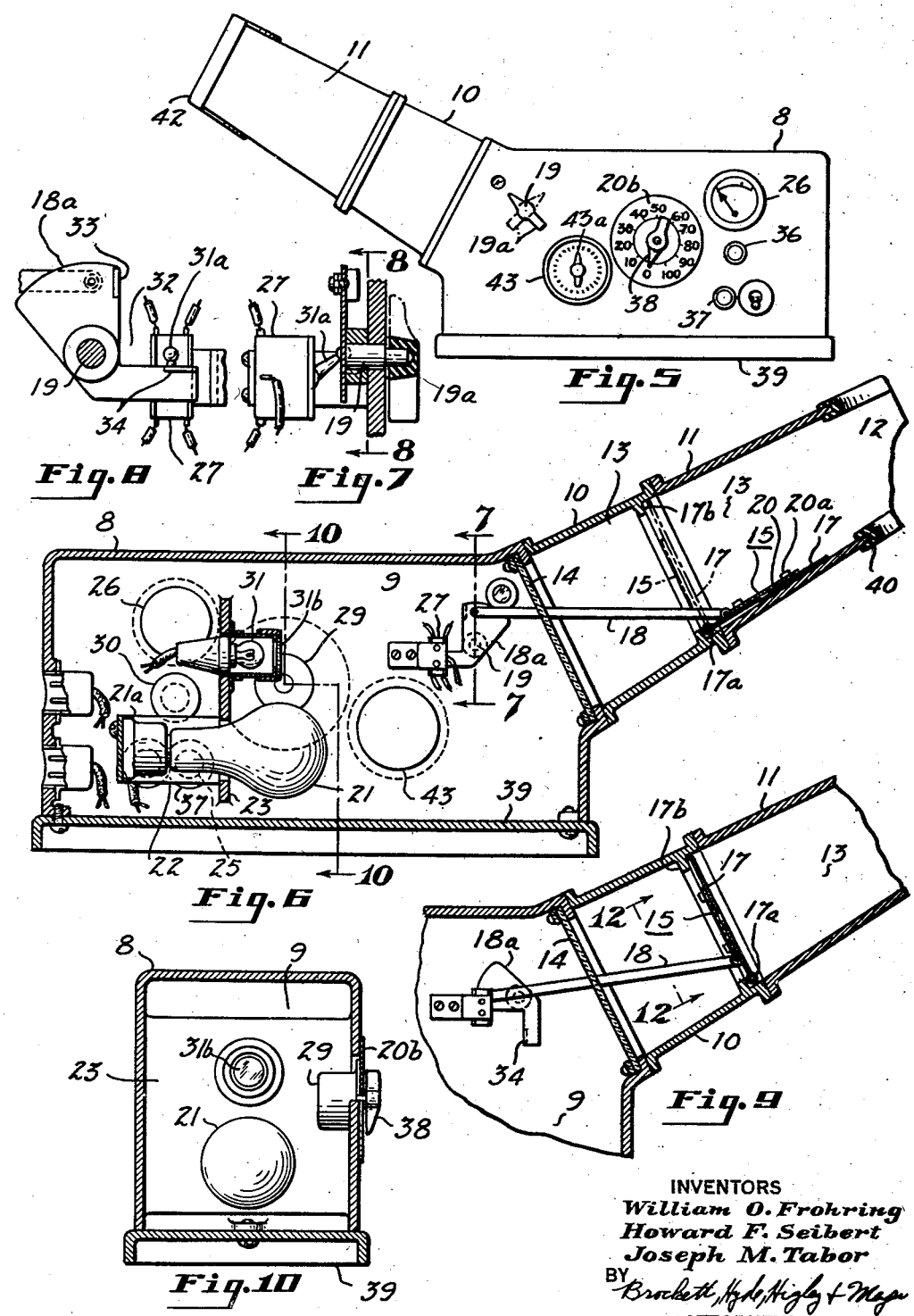

March 11, 1941.  W. O. FROHRING ET AL  2,234,240
INSTRUMENT FOR DETERMINING VITAMIN A DEFICIENCY
Filed Oct. 26, 1937  4 Sheets-Sheet 3

INVENTORS
William O. Frohring
Howard F. Seibert
Joseph M. Tabor
BY
Brockett, Hyde, Higley & Meyer
ATTORNEYS

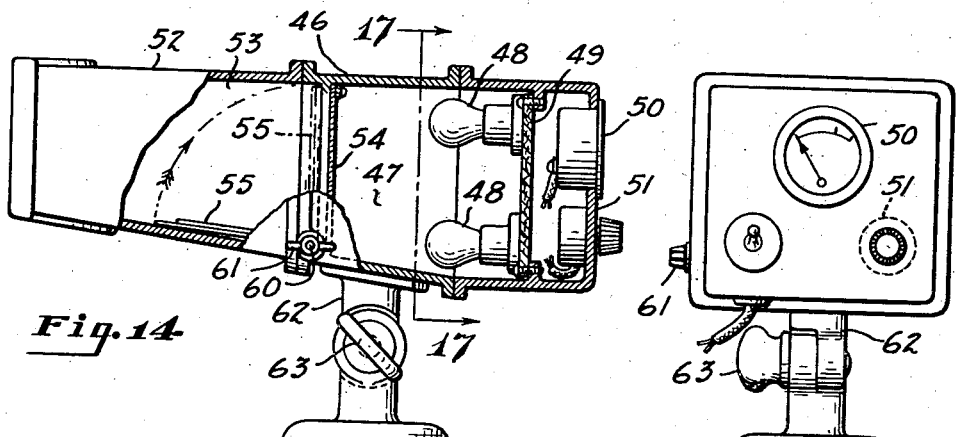
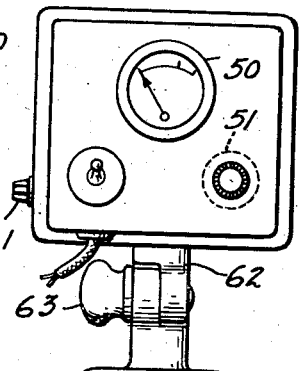
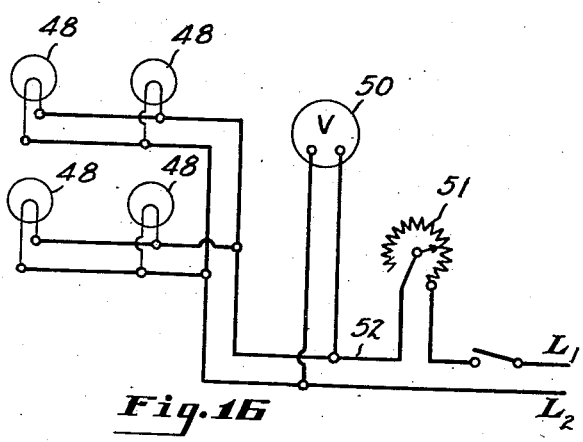
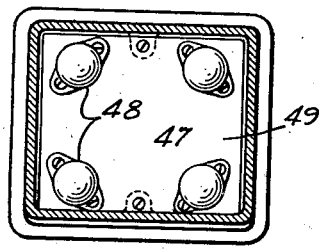
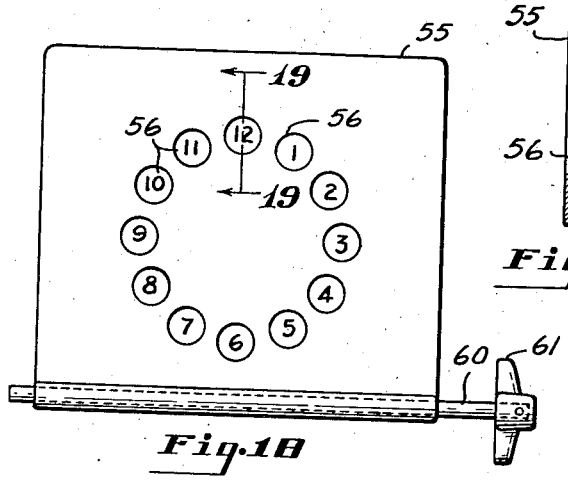
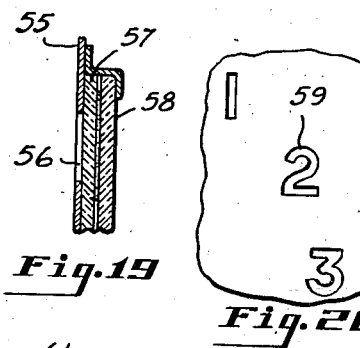

Patented Mar. 11, 1941

2,234,240

UNITED STATES PATENT OFFICE 2,234,240

INSTRUMENT FOR DETERMINING VITAMIN A DEFICIENCY

William O. Frohring, Cleveland Heights, and Howard F. Seibert and Joseph M. Tabor, Cleveland, Ohio, assignors, by direct and mesne assignments, to Frober Faybor Company, Cleveland, Ohio, a corporation of Ohio Application October 26, 1937, Serial No. 171,080

3 Claims. (Cl. 88—20)

Our invention relates to an improved method of and to an instrument for testing or examining patients to determine their vitamin A status and is a continuation in part of our application Ser. No. 85,128 filed on June 13, 1936. More particularly, it relates to a scientific instrument and to a method of examining the human eye to determine the rate at which visual purple is depleted in the retina of the eye in comparison to that of a normal individual by a source of bright light which is capable of depleting visual purple at a rate faster than it is regenerated.

The correlation between night blindness and vitamin A deficiency is now well known. For instance, a recent report of the Journal of the American Medical Association, May 16, 1936, page 1733, states that "It is generally agreed that the physical symptom of vitamin A deficiency is night blindness, or nyctalopia." Night blindness is caused by the inability of an individual to regenerate quickly a sufficient amount of visual purple in the retina of the eye to see in a faintly lighted space after the eye has been subjected to bright lights, such as when walking from a brightly lighted lobby into a dark or semi-dark theater. The difficulty in seeing is attributed to the fact that the visual purple in the retina of the eye has been depleted by bright lights but after an individual has been in the theater for a short period, a sufficient amount of visual purple is regenerated in the retina of the eye to enable the individual to distinctly see the aisles and seats. Night blindness caused by vitamin A deficiency will disappear promptly if vitamin A is restored to the system. If vitamin A is not restored to the system within a reasonable length of time, however, xerophthalmia develops, which finally leads to blindness. Of greater importance, however, is the fact that by our improved method of testing the eye, even mild degrees of vitamin A deficiency may be readily determined and vitamin A therapy may be instituted and the condition corrected.

It is now well recognized that bright light bleaches the visual purple in the retina of the eye and that its subsequent replenishment is dependent upon the amount of vitamin A in the system. Previous investigators have therefore sought to test patients to determine their vitamin A status by first bleaching the visual purple and then determining the rapidity with which it is replenished as compared to that of a normal person after the eye has been dark adapted for a predetermined period of time. Such methods, however, have failed to take into consideration that during the bleaching of the visual purple in the retina of the eye, it is being constantly regenerated. In our investigations of this subject we have also found that the light environment to which the patient was subjected before the bleaching operation and the quality of light utilized in the bleaching and testing of the eye are material factors in determining vitamin A deficiency.

It is therefore the aim of our invention to provide an improved process of examining the human eye to determine the vitamin A status of individuals or patients being examined.

Another object of our invention is to provide an improved process of testing the human eye to determine the degree of visual purple depletion effected in the retina of the eye when it is exposed to a standard source of bright light after a predetermined dark adaptation period as compared to the visual purple depletion effected in the retina of the eye of a normal person subjected to the same treatment.

A further object of our invention is to provide an improved self-contained instrument including all the necessary parts and apparatus to complete an examination of a patient and determine his ability as compared with the ability of a normal person to regenerate visual purple in the retina of the eye while it is being subjected to a source of bright light of sufficient intensity to deplete visual purple in the retina of the eye faster than it is regenerated.

Another object of the invention is to provide an improved instrument of simple construction by means of which vitamin A deficiency of individuals may be readily indicated.

Further objects of our invention will be apparent as the description proceeds.

Our invention will be better understood by reference to the accompanying drawings, in which Figs. 1, 2 and 3 are charts illustrating our improved method of testing the eye to determine the vitamin A status of individual or patients and showing the effect of vitamin A therapy;

Fig. 5 is a side elevation of our improved instrument;

Fig. 6 is a longitudinal sectional view showing the quincunx in idle position;

Fig. 7 is a cross sectional view on the line 7—7 of Fig. 6;

Fig. 8 is a cross sectional view on the line 8—8 of Fig. 7;

Fig. 9 is a detail view of the neck portion of the instrument showing the quincunx in operative position;

Fig. 10 is a cross sectional view on the line 10—10 of Fig. 6;

Fig. 14 is a view of a modified form of an instrument by means of which an approximation of the vitamin A status of individuals may be obtained by our improved method;

Fig. 15 is a rear view of the apparatus shown in Fig. 14;

Fig. 16 is a digrammatic view of the electrical connections for the apparatus shown in Fig. 14;

Fig. 17 is a cross sectional view on the line 17—17 of Fig. 14;

Fig. 18 is an enlarged elevational view of the apertured panel shown in Fig. 14;

Fig. 19 is a cross sectional view on the line 19—19 of Fig. 18; and

Fig. 20 is a modified view showing another arrangement of forming the numerals shown in Fig. 18.

Figure 1:
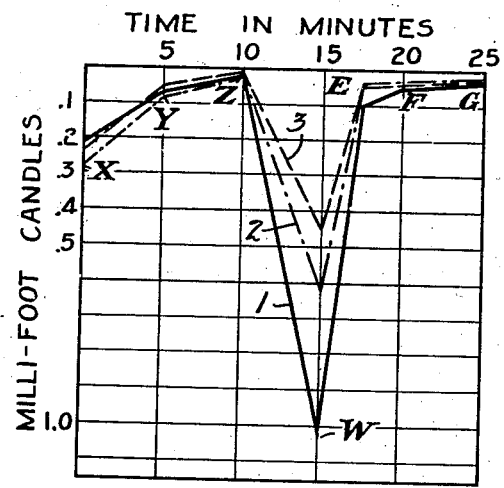
Figure 2:
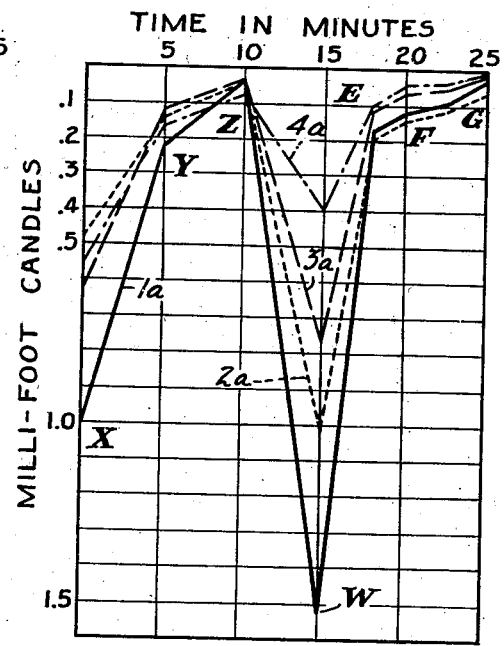
Figure 3:
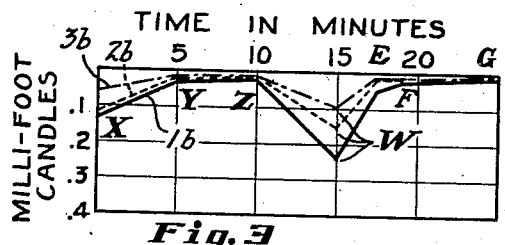

Referring first to Figs. 1 to 3, inclusive, of the drawings in which the ordinate represents millifoot candles and the abscissa designates time in minutes, charts are given showing different individuals who were tested by our improved process, both before and after vitamin therapy had been instituted.

As shown in Fig. 1, when the patient enters the room the threshold of his eyes to light is first determined as indicated by the letter X in curve 1. The eyes are then dark adapted for a sufficient length of time to permit the visual purple in the retina of the eye to become substantially constant and the threshold to light is again taken at the end of that period or at a predetermined interval or intervals of time during and at the end of that period; for instance, the threshold to light may be taken at the end of a five minute period, as indicated at Y on the drawings, and again at the end of a ten minute period, as indicated at Z on the drawings. While the test light may be of any predetermined quality, a small Mazda bulb provided with a daylight filter connected in series with a potentiometer for varying the quantity of light was utilized in preparing the charts. The eyes were then bleached for a predetermined period of time with a light of sufficient intensity to bleach the visual purple in the retina of the eye of a normal person faster than it is regenerated. It is essential to provide a bleaching light which is of the same quality as the test light; that is, the bleaching light must have the same energy distribution in the visible spectrum as the test light. A 110 volt, 100 watt frosted daylight lamp was employed and the threshold to light was again determined by the small test lamp as indicated at W. The eyes were then dark adapted and the threshold to light was determined by the small test light after a predetermined period or at intervals during and at the end of a predetermined period. As illustrated in the chart, the dark adapted eye was tested at three, five and ten minute intervals as indicated at points E, F and G on the chart.

Vitamin A therapy was then instituted, curve 2 showing the threshold to light of the same individual under the same conditions after being administered 30,000 U. S. P. units of vitamin A concentrate daily for five days, and curve 3 his threshold to light after being administered 30,000 U. S. P. units of vitamin A daily for a period of thirty days. The improvement in the individual's threshold to light will be readily apparent from the chart. From an examination of a large number of people, the chart of the individual shown in Fig. 1 indicates that his vitamin A status ranges from normal to slightly deficient.

The measurements of the threshold to light of the individual whose chart is shown in Fig. 2 were taken in the same manner. The chart, however, shows that this individual had a poor threshold to light before vitamin A therapy was instituted, as indicated by the significant points on curve 1a. The significant points on curve 2a, 3a and 4a indicate the threshold of light of the same individual after being administered 60,000 U. S. P. units of vitamin A concentrate daily for a period of seventeen days, twenty-four days and thirty-six days, respectively. The remarkable improvement as indicated by the significant points on curve 4a will be readily apparent.

In the chart shown in Fig. 3, the significant points on curve 1b indicate the threshold to light of an individual who is above normal, that is, the individual is not deficient in vitamin A. To test the effects of vitamin A therapy upon this individual, 30,000 units of vitamin A concentrate was administered daily for five days and tests were again made as indicated by the significant points on curve 2b and a similar quantity of vitamin A concentrate was administered daily for a period of fifteen days and the significant points again determined as indicated by the curve 3b. It was found that his threshold to light improved, although not as much as the vitamin A deficient individual whose chart is shown in Fig. 2 or the substantially normal individual whose chart is shown in Fig. 1.

In making the test it is essential to first dark adapt the eye as shown in the charts until the visual purple in the retina of the eye is approximately constant. About ten minutes or longer is required for this purpose. After the bleaching operation the threshold to light must be quickly determined, preferably within twenty seconds. This is a very significant reading because as visual purple is being bleached from the eye it is constantly being regenerated from the system and the rate of regeneration is particularly rapid after the bleaching operation. To provide accurate results, it is also essential that the bleaching light and the test light shall have the same energy distribution in the visible spectrum because it has been found by tests that the visual purple may be bleached with light having a particular energy distribution while it is being regenerated after being bleached with light having a different energy distribution. For instance, the bleaching light may be composed of rays of such wave lengths that the color of the bleaching light is red, or the rays may be of such wave lengths that the color of the bleaching light is green or blue. If the bleaching is effected by light having a particular energy distribution, however, the test to determine the end point to visible perception of the light adapted eye must be made with light having the same energy distribution. While any desired filter may be employed to provide a bleaching light and a test light having the same energy distribution, a daylight filter is preferably utilized for both the bleaching and the test light because it provides a more even energy distribution over the spectrum.

Figure 4:
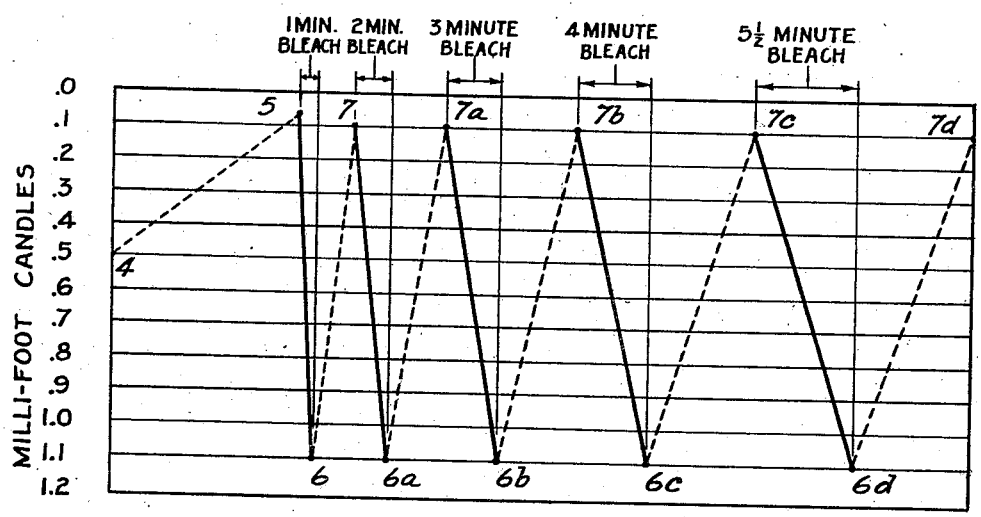
Fig. 4 is a chart showing the effect of previous light environment upon the rate of the regeneration of visual purple in the dark adapted eye.
Figure 11:
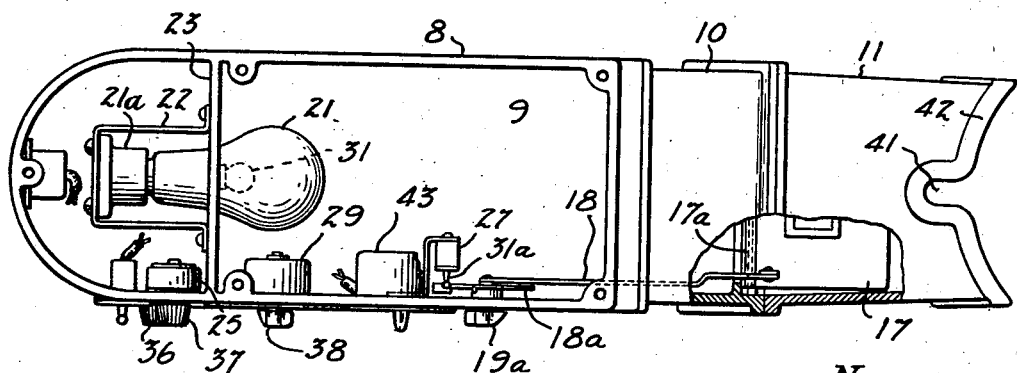
Fig. 11 is a bottom plan view of the instrument, the bottom portion being removed.

The significance of applicants' improved test and the error incident to prior theories will be readily apparent from Fig. 4 of the drawings in which the numeral 4 designates the threshold to light of an individual as he came into the testing room and the numeral 5 his threshold to light after he had been dark adapted for a period of ten minutes. The visual purple in the retina of the eye of this individual was then bleached for one minute and the time required to regenerate sufficient visual purple in the retina of the eye to see light of 0.1 millifoot candle power intensity of the same quality or energy distribution over the visible spectrum was determined as indicated by the numeral 7. His eyes were again bleached for periods of two minutes, three minutes, four minutes and one-half minutes, respectively, with light of the same intensity, the eye being dark adapted after each bleaching operation, and the time required to regenerate sufficient visual purple in the retina of the eye to see light of 0.1 candle power after each bleaching operation was determined, as indicated by the numerals 7a, 7b, 7c and 7d. This chart indicates clearly that previous light environment is an essential factor in determining the rate at which visual purple is regenerated in the retina of the eye during dark adaptation, but that during the bleaching process an equilibrium is soon established between the amount of visual purple which is bleached in the retina of the eye and the amount which is regenerated. This is shown by the amount of light required for visible perception after bleaching periods of the time specified, as indicated by the points 6, 6a, 6b, 6c and 6d.

An apparatus for performing the test shown in charts 1 to 3, inclusive, is disclosed in Figs. 5 to 13, inclusive. The apparatus comprises a suitable housing or casing which serves to enclose, contain and support within it the working parts of the apparatus as well as to support controlling and indicating parts accessible or visible from its exterior. The casing shown in the drawings comprises a main body portion 8 having a chamber 9 to one end of which body is attached a tubular neck formed of members 10 and 11, its outer end being provided with an opening 12 through which the patient looks into the neck chamber 13 and through a luminous translucent opalescent glass wall or window 14 forming a dividing wall between chambers 9 and 13 and fixedly mounted in the casing. This luminous wall of course always lies a chosen distance from the eyes, determined by the length of the neck 10, 11 and is uniformly illuminated by a light suitably produced within the chamber 9, either by a test light for moderately illuminating the luminous wall and thereby illuminating the lighted spots a, b, c on a target 15 suitably mounted in a manner to be movable into or out of operative position crosswise of the chamber 13 between the eyes of the patient and the luminous window, or a bright light, the effect of which is applied directly to the eyes of the patient by his direct view of the full area of the luminous window.

With this apparatus and after the eye has been dark adapted for a predetermined period of time, preferably for five to ten minutes or longer, the target is swung into operative position shown in dotted lines and the intensity of its illumination is adjusted or regulated to determine the first end point or the threshold to light after which the target is swung into inoperative position and the eyes of the patient are subjected to the application of bright lights to the luminous window for a predetermined time. After the lapse of the predetermined or standard period, the target is again swung into operative position and the threshold to light of the light adapted eye is quickly determined.

The target 15 may be of any suitable form for the purpose, such as a plate 17 having apertures in the form of the usual quincunx, and is movable either to idle or operative position as shown respectively in full and dotted lines in Fig. 6 of the drawings, the plate 17 being entirely opaque except at the groups of spots a, b, c, through which light passes from the source to the eye of the observer. In the form shown, the plate 17 is hinged at 17a at one side of the neck chamber and in operative position lies against the shoulder 17b of the neck. It may be conveniently operated by a link 18 connecting it to a plate-like arm 18a mounted on a shaft 19 in the wall of the casing and provided with an operating knob or handle 19a on its outer end. The several spots a, b and c may all be alike, such as round, or they may differ in shape to distinguish them from each other, such as by giving them the outlines of objects familiar and interesting to children, or, as shown conventionally, triangular in group a, round in group b and square in group c.

Figure 12:
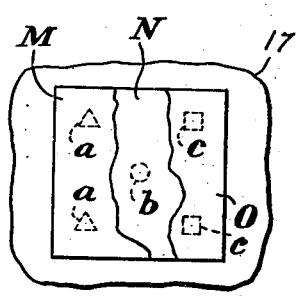
Fig. 12 is a view on the line 12—12 of Fig. 9, showing one suitable way in which varying intensity of the light through different apertures in the quincunx may be secured.

Suitable means is provided for varying the intensity of illumination of the spots on the diaphragm, not only to differentiate the illumination of spots a, b, c, from each other, as is usual, but also to simultaneously vary the absolute intensity of the illumination of all spots. Differentiation between spots may be secured, for example, by attaching a translucent membrane 20 to the plate 17 by any suitable means, such as lugs 20a, and interposing a different number of layers of paper between the translucent membrane and the various apertures in the plate 17 in such a manner that spots a will appear brighter than spot b, and spot b brighter than spots c. This feature is shown in Fig. 12, where spots a are covered with one layer M of translucent paper, spot b with two layers N of a similar paper, and spots c with three layers O of a similar paper.

Means for varying the absolute intensity of the illumination of the translucent window 14 and consequently of the lighted spots on the diaphragm may be secured in any suitable manner, such as by means of a rheostat, a diaphragm, by varying the distance of the test light from the window 14, by a neutral gray wedge, a disc photometer, such as that disclosed in the copending application of Neuman H. Fayerweather, Ser. No. 129,044, filed on March 4, 1937, or by varying the amount of current supplied to the test light which illuminates the window during determination of the visible perception to light. A rheostat or potentiometer is preferably employed for varying the quantity of light because it is inexpensive and can be generally used. By utilizing a rheostat or potentiometer, a wider range of readings may also be obtained than when a shutter or diaphragm method is employed and greater accuracy is provided because the light is not concentrated on a particular spot.

The use of a rheostat or potentiometer in varying the quantity of light, however, introduces the factor of changes in the quality of test light because of differences in filament temperature at different voltages. To minimize this error, the instrument is calibrated by means of a photo cell which is placed across the neck piece 12 and is screened by a filter having a similar range of sensitivity as the human eye. By this method the proportion of light from the test light which actually reaches the eye at a certain reading on the scale 20b may be determined in millifoot candles and as the intensity of the light is raised or lowered by varying the amount of resistance in series with the light, the number of millifoot candles of light reaching the eye may be determined at any scale reading.

The test light is also preferably provided with a daylight filter to provide a light having a more even energy distribution over the visible spectrum than artificial light. The use of a daylight filter is particularly desirable when a rheostat or potentiometer is employed to vary the intensity of the light because when an ordinary Mazda lamp is employed, variation in the voltage causes a variation in the quality of the light and the daylight filter partially corrects for emission changes in the filament.

Bright illumination for bleaching the patient's eyes is secured by utilizing a source of light which is sufficient to deplete visual purple in the retina of the dark adapted eye faster than it is regenerated. It is essential that the bleaching light be of the same quality; in other words, that it shall have the same energy distribution in the visible spectrum as that utilized in the test light. Any suitable means may be provided to filter the bleaching light and the test light to provide light for bleaching and for testing which is of the same quality. For instance, both the bleaching light and the test light may be passed through a suitable filter, such as a daylight or Wratten filter which may be located in any desired position between the sources of light and the target, such as in proximity to the dividing plate 14, or the opalescent plate 14 may be formed of material that filters out rays of light from the different sources which vary from each other in quality or energy distribution in the visible spectrum.

Figure 13:
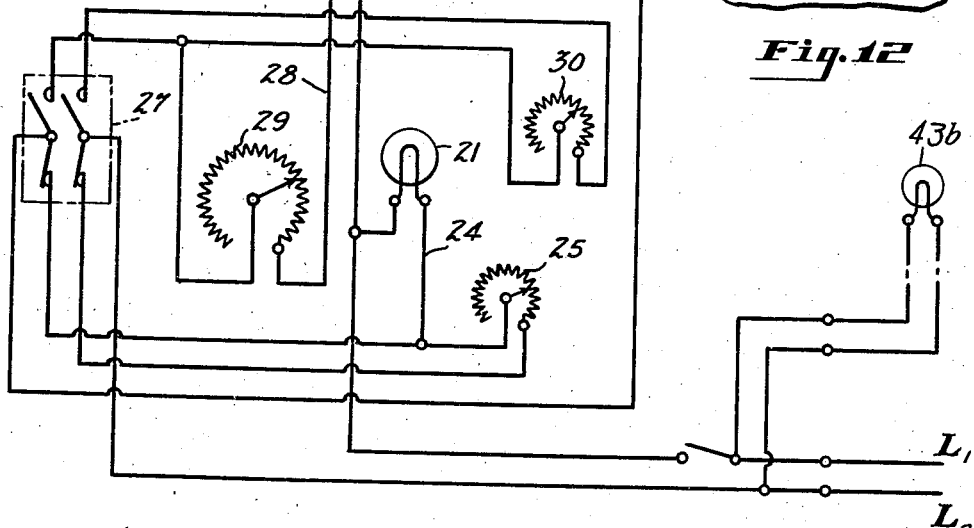
Fig. 13 is a diagrammatic view showing the electrical connections for the apparatus.

As shown in the drawings, a 110 volt, 100 watt daylight bulb 21 is utilized for bleaching which is mounted in a socket 21a on a suitable bracket 22 which is attached to a panel 23, said lamp being in a circuit 24 from the leads L1, L2 as shown in Fig. 13 of the drawings. Also included in this circuit is a potentiometer 25 and connected in shunt with the lamp is a voltmeter 26. Circuit 24 is in parallel, through a double pole double throw switch 27 with a circuit 28, said circuit also including potentiometers 29 and 30 and the test light 31 for determining the end point to visible perception, the test light 31 being mounted in a housing provided with a daylight filter 31b. When circuit 28 is connected to leads L1, L2, the voltmeter 26 is connected in shunt with the test light 31 and the potentiometer 29. It will thus be apparent that by varying the resistance of potentiometer 25 when the bright light is in the circuit the voltage across the terminals of the bright lamp may be varied to correspond to the voltage at which the instrument was calibrated and in like manner by varying the resistance of the potentiometer 30, the voltage across the test lamp 31 and the potentiometer 29 may be varied to correspond to that at which the instrument was calibrated.

Since means must be provided for determining the end point to visible perception promptly after the visual purple has been bleached from the eye, in our improved instrument the knob 19a which moves the plate 17 to either of its two positions is utilized to actuate switch 27.

In the arrangement shown said switch is of the toggle type mounted on the inner surface of the wall of the casing with its operating arm 31a lying in a recess 32 between the edges of two portions 33, 34 of the arm 18a, so that rotation of shaft 19 in one direction simultaneously moves the diaphragm to its idle position and throws switch 27 to its position energizing circuit 24, whereas movement of shaft 19 in the opposite direction moves the diaphragm to its operative position and switch 27 to its position energizing circuit 28. The potentiometers 30, 25 and 29 are mounted in chamber 7 on one of the walls of the casing, the operating shafts of which extend through the wall and are provided on its opposite side with operating knobs 36, 37 and 38 respectively, the shaft for rheostat 29 being provided with a scale 20b for the purpose previously described.

For convenience in replacement of lamps and adjustment or repair of the apparatus, the main body of the casing is provided with a removable bottom 39 while the two members 8 and 9 of the neck are detachably bolted or otherwise connected to each other and to the main casing body. Also preferably the outer end of the neck or the edge of the outer opening is specially formed to fit the forehead and nose, such as by curving the edges of the opening as at 40 and providing it with a nose recess 41, and the edge of said opening may be shielded with a removable rubber bead 42 not only to secure a more comfortable fit, but also a more effective seal against light leakage.

With this apparatus, the operator, after connecting the device to a suitable source of current and closing the main switch, turns the knob 19a to the preparation position, in which circuit 28 is closed and the test lamp 31 is illuminated. This step is effected when the patient enters the testing room. Target 15 is in operative position, the voltage of the machine is set at the point at which it was calibrated by means of resistor 30 and the end point to visible perception is determined by operating knob 36 in a direction which varies potentiometer 29 and thus the intensity of test light 31 until only three of the spots, namely, spots a and b are visible. After the end point to visible perception has been determined the eye is dark adapted for a predetermined period of time, say ten minutes, and the end point to visible perception is again determined. The diaphragm 17 is then moved to idle position, the bright light is turned on and the patient applies his eyes to the opening in the end of the neck and looks directly at the illuminated translucent wall 14 for a definite period of time, say from three to five minutes, as determined by any suitable timing device. As indicated in the drawing an alarm clock 43 having a scale reading in minutes is provided for this purpose which fits in an aperture in the casing and is adapted to sound an alarm at the end of the period for which it is set, the setting being effected by the handle 43a. During this operation the five-point diaphragm is in its idle position and lamp 31 is not illuminated. The effect of this operation is to deplete the visual purple in the retina of the eye faster than it is regenerated.

Next, the operator turns the knob 19a to its other position and thereby simultaneously moves the five-point diaphragm to its operative position, opens circuit 24, turns off lamp 21, closes circuit 28 and illuminates test lamp 31. Immediately another determination is made of the end point to visible perception. The eyes of the patient are then dark adapted for a standard period of time, say for three minutes, and the end point to visible perception is again determined. It may also be determined after five and ten minutes, respectively, as shown in the charts. Tests may also be made at one or more intervals during the dark adaptation test prior to the bleaching operation. The tests made during dark adaptation while not essential in determining the vitamin A status of the patient gives valuable information to the eye specialist with respect to the dark adapted threshold.

The test may be modified to a certain extent and significant results still obtained. For instance, the eye may be dark adapted for a sufficient length of time after the patient enters the room to permit the visual purple in the retina of the eye to become substantially constant. The dark adapted eye may then be bleached and the end point to visible perception quickly obtained after the bleaching process with a test light of the same quality as the bleaching light. As indicated in Fig. 13 a small light 43b may be connected in series from leads L1, L2 for reading the scale 20b in case the test is made in a dimly lighted or dark room.

A modification of our improved instrument is shown in Figs. 14 to 20, inclusive, of the drawings. While our improved test may be made with the modified instrument, the test obviously will not be as significant as when the instrument shown in Figs. 5 to 13, inclusive, is employed. Fairly accurate results, however, can be obtained and if a patient or individual is deficient in vitamin A, this fact may be determined.

As illustrated, the instrument includes a casing 46 provided with a chamber 47 containing a plurality of bulbs 48 mounted upon a panel 49 extending across the chamber and beyond which is a voltmeter 50 and a potentiometer 51 mounted upon the end wall of the casing. The casing 46 is extended to form a neck portion 52 through which a patient looks into the neck chamber and to the luminous translucent opalescent wall or window 54, forming a dividing wall between the chambers 53 and 47. The luminous wall always lies at a standard distance from the eye, determined by the neck 52 and is uniformly illuminated by the light produced within the chamber. To provide means for determining the end point of visible perception, a target 55 provided with a plurality of apertures 56 is movable across the neck portion 52 from the idle position shown in full lines to operative position shown in dotted lines in Fig. 14. The intensity of the apertures may be varied by any suitable means, such as by placing layers of translucent paper of different thickness over the apertures, or varying the number of layers over the different apertures. As shown in the drawings, the apertures are in the form of a clock and translucent layers of paper of varying thickness are interposed between two translucent glass panels 57 and 58 in front of the different apertures in such a manner that the quantity of light varies and preferably, light of the greatest intensity passes through the aperture designated 1 on the clock, and light of the least intensity passes through the aperture designated 12 on the clock. The numerals may be painted on the glass panel 57 as shown in Fig. 18, or the apertures may be made in the form of numerals, as illustrated in Fig. 20 by the numeral 59. The target 55 may swing to idle or operative position by any suitable means, such as a shaft 60 journaled in the casing to which the target is secured and which is operated by a handle 61. If desired the instrument may be mounted upon a suitable base 62 which is provided with a member 63 for adjusting its inclination and while light of any desired quality may be employed, daylight bulbs are preferably utilized.

In making the test with this form of instrument, the patient's eyes are first dark adapted for a period of from approximately five to ten minutes or longer. The target 54 is placed in position and the patient looking through neck piece 52 is requested to state the highest numeral which he can see. The target is then swung to idle position and the visual purple in the patient's eyes is bleached for a predetermined period of time, say three minutes, by means of light from the daylight bulbs. The target is then swung to operative position and the patient is again requested to specify the particular number which he can see. The eye is then dark adapted and a plurality of tests are made on the dark adapted eye as specified in the previous example. Before making the test the instrument is preferably calibrated in the method previously described and for this purpose potentiometer 51 is connected in series and voltmeter 50 is connected in shunt with the lamps in the circuit from lines L1, L2.

From the foregoing description it will be seen that we have provided an improved process of determining the vitamin A status of individuals which is not only effective in testing night blindness caused by vitamin A deficiency but which is also effective in indicating the status of individuals or patients who are only mildly deficient in that vitamin.

It will also be apparent that we have provided an improved process of determining the rate at which visual purple is depleted in the retina of the eye of a patient as compared to a normal individual by a source of bright light which has sufficient intensity to bleach visual purple faster than it is regenerated by the human system.

It will also be seen that we have provided an improved instrument by which the degree of vitamin A deficiency of a patient may be accurately determined and an instrument for general use in which the vitamin A status of an individual may be indicated.

What we claim is:

1. An eye testing apparatus of the class described, comprising a casing having a body portion closed against the entrance or exit of light and an eye opening which is adapted to receive light rays which emanate from within said body portion, a source of bright illumination mounted in said body portion in optical alinement with the eye opening, a source of dim illumination arranged in said body portion, the source of bright illumination having sufficient light energy to provide rays of sufficient intensity to light adapt a dark adapted eye placed at said opening, a movable target mounted in said casing between said illuminating sources and said eye opening, said target having opaque portions and translucent portions of varying degrees of translucency providing test object means adapted to be viewed through the said eye opening, said target being movable to an idle position in which unobstructed rays of light pass from the source of bright illumination to the eye opening or to an operative light threshold determining position in which all light rays which might pass to an eye at said opening are intercepted except light rays which pass through translucent portions of said target, the dim light source being arranged to illuminate said translucent portions when the target is in its operative position, means whereby said target may be moved either to its idle or to its operative position, means for rendering the source of bright illumination effective when said target is in idle position, means whereby the source of bright illumination may be made ineffective and the dim source of illumination made effective when the target is in operative position, and means for regulating the intensity of the dim source of illumination.

2. Apparatus as specified in claim 1, provided with filtering means arranged between both sources of illumination and said eye opening to provide light of substantially the same energy distribution in the visible spectrum for both light adapting and for determining the light threshold.

3. Apparatus of the class described in claim 1, in which the source of dim illumination is energized by an electric circuit, and including a potentiometer associated with said circuit for enabling the intensity of illumination from the dim source to be quickly adjusted manually to an end point determining value with relation to the relative translucencies of different translucent portions of said target.

WILLIAM O. FROHRING.
HOWARD F. SEIBERT.
JOSEPH M. TABOR.